(12) United States Patent
Ryu et al.

(10) Patent No.: US 8,334,070 B2
(45) Date of Patent: Dec. 18, 2012

(54) ELECTRODE MATERIAL INCLUDING CLAY MINERAL AND ELECTROCHEMICAL CELL EMPLOYED WITH THE SAME

(75) Inventors: Ji Heon Ryu, Seoul (KR); Songhun Yoon, Daejeon (KR); HanHo Lee, Daejeon (KR); Eun Ju Lee, Daejeon (KR)

(73) Assignee: LG Chem, Ltd. (KR)

( * ) Notice: Subject to any disclaimer, the term of this patent is extended or adjusted under 35 U.S.C. 154(b) by 927 days.

(21) Appl. No.: 11/853,302

(22) Filed: Sep. 11, 2007

(65) Prior Publication Data

US 2008/0063939 A1    Mar. 13, 2008

(30) Foreign Application Priority Data

Sep. 11, 2006 (KR) .................. 10-2006-0087130

(51) Int. Cl.
*H01M 4/02* (2006.01)
*H01M 4/13* (2010.01)
*H01M 4/62* (2006.01)

(52) U.S. Cl. ........................... 429/209; 429/232

(58) Field of Classification Search ................ None
See application file for complete search history.

(56) References Cited

U.S. PATENT DOCUMENTS

| 4,393,125 | A | * | 7/1983 | Skarstad et al. ............. 429/105 |
| 5,340,670 | A | * | 8/1994 | Takami et al. ............... 429/331 |
| 5,783,322 | A | * | 7/1998 | Nagai et al. ..................... 429/7 |
| 6,475,670 | B1 | * | 11/2002 | Ito ................................ 429/217 |

FOREIGN PATENT DOCUMENTS

| JP | 8279354 | 10/1996 |
| JP | 9115505 | 5/1997 |
| JP | 3587935 | 8/2004 |
| JP | 2004296370 | 10/2004 |

* cited by examiner

*Primary Examiner* — Barbara Gilliam
*Assistant Examiner* — Adam A Arciero
(74) *Attorney, Agent, or Firm* — Lerner, David, Littenberg, Krumholz & Mentlik, LLP

(57) ABSTRACT

Provided is an electrode material, which contains an electrode active material, comprising a clay mineral in an amount of the range of 5% by weight or less based on the total weight of the electrode material for increasing the mechanical strength of the electrode material and improving the impregnation ability of an electrolyte.

9 Claims, No Drawings

ELECTRODE MATERIAL INCLUDING CLAY MINERAL AND ELECTROCHEMICAL CELL EMPLOYED WITH THE SAME

FIELD OF THE INVENTION

The present invention relates to an electrode material comprising a clay mineral. More specifically, the present invention relates to an electrode material which comprises a clay mineral in an amount of the range of 5% by weight or less based on the total weight of the material, in which the clay mineral increases mechanical strength of the electrode material and improves the impregnation ability of an electrolyte into a separator and an electrode, such that the electrode material exhibits improvement in the rate characteristics and the preservation capacity, and to an electrochemical cell employed with the electrode material.

BACKGROUND OF THE INVENTION

Technological development and increased demand for mobile equipment have led to a rapid increase in the demand for secondary batteries as an energy source. In recent years, applicability of secondary batteries has been realized as power sources for electric vehicles (EVs) and hybrid electric vehicles (HEVs). As such, a strong need for the stability of batteries due to increase in the number and capacity constituting a battery pack has grown. In addition, when the battery is installed in a vehicle, exposures to the vibration and external impact are increased. Thereby, a mechanical strength of batteries that can operate as a resistivity against external impact is also demanded as a major characteristic. In the light of such trends, a great deal of research and study has been focused on secondary batteries which are capable of meeting various demands. Among other things, there has been an increased demand for lithium secondary batteries having high-energy density, high-discharge voltage and power output stability.

The lithium secondary battery uses a metal oxide such as $LiCoO_2$ as a cathode active material and a carbonaceous material as an anode active material, and is prepared by disposition of a porous polymer separator between the anode and cathode and the addition of a non-aqueous electrolyte containing a lithium salt such as $LiPF_6$. Upon charging, lithium ions exit from the cathode active material and migrate to enter into a carbon layer of the anode. In contrast, upon discharging, lithium ions exit from the carbon layer and migrate to enter into the cathode active material. Here, the non-aqueous electrolyte serves as a medium through which lithium ions migrate between the anode and cathode. Such a lithium secondary battery must be basically stable in a range of operating voltage of the battery and must have ability to transfer ions at a sufficiently rapid rate.

The non-aqueous electrolyte is injected into the battery at the final stage of fabricating the lithium secondary battery. At this time, the electrodes are rapidly and completely wetted by the electrolyte so as to reduce time consumption for the battery fabrication and to optimize the battery performances.

An aprotic organic solvent, such as ethylene carbonate, diethyl carbonate, or 2-methyl tetrahydrofuran, is mainly used as the non-aqueous electrolyte of the lithium secondary battery. Such an electrolyte is a polar solvent having polarity enough to effectively dissolve and dissociate the electrolyte salt, and, at the same time, an aprotic solvent having no active hydrogen. Occasionally, this electrolyte has high viscosity and surface tension due to wide interaction in the electrolyte. Consequently, the non-aqueous electrolyte of the lithium secondary battery has a low affinity for an electrode material including a polytetrafluoroethylene and polyvinylidene fluoride bonding agent, and, as a result, the electrode material is not easily wetted by the non-aqueous electrolyte. This is one of the principal factors to ineffectively increase the time consumption for the battery fabrication.

Especially, an anode used in the lithium secondary battery is strongly oleophilic, thus its wettability by the hydrophilic electrolyte is not good. When the activating operation of the battery is carried out while the electrodes are not sufficiently wetted by the electrolyte, a solid electrolyte interface (SEI) film is not properly formed at the anode, and therefore, the life characteristics of the battery is deteriorated.

In addition, as high-capacity batteries are in demand, lithium secondary batteries with the higher energy density of electrode are being developed. However, the improvement in the energy density led to a great decrease in the electrode porosity, and, as a result, difficulties to penetrate electrolyte into the electrode increased. When the active materials constituting the electrodes are not sufficiently wetted by the electrolyte, a path for migrating lithium ions is restricted, thereby causing the problems such as deterioration in the rate characteristics and reduction in the capacity. Therefore, electrode components with excellent wettability by the electrolyte are in demand.

Therefore, there is an urgent need for a technology that can increase electrode wettability by the electrolyte and improve stability, while having excellent performance of batteries.

In this connection, the present invention, as described below, provides an electrode material containing a clay mineral for improving stability of a battery, and, at the same time, wettability by the electrolyte.

There has not existed a technique to contain a clay mineral in an electrode material to this point. However, some techniques for using cay minerals as electrode active materials or coating clay minerals onto electrode active materials are known. For example, Japanese Patent Laid-Open Publication No. 1997-115505 discloses a technique for covering the surface of a positive electrode material with a lithium conductive clay material for preventing generation of self-discharge and decomposition of an electrolyte as a result of the electrolyte contacting and reacting with the positive electrode material. Japanese Patent Laid-Open Publication No. 2004-296370 is a technique that uses a layered clay mineral as an anode active material, and discloses a technique for manufacturing the anode active material by separating a layered clay mineral with injected lithium ions between the layers of the clay mineral. In addition, Japanese Patent No. 3587935 discloses a technique that uses the carbon laminated body as a negative electrode active material prepared by inserting carbon atoms into a layered clay mineral such as saponite or montmorillonite, heat treating for polymerization, and then performing a carbonization process at 500 to 1200° C.

However, the above-mentioned techniques use only the swelling layered clay minerals, in which the clay mineral is used as an anode active material for improving discharge characteristics or coated on a cathode active material for preventing an electrolyte from decomposition. Therefore, there is a big difference with the present invention where a clay mineral is added to an electrode material so as to improve wettability by an electrolyte.

Meanwhile, Japanese Patent Laid-Open Publication No. 1996-279354 discloses a technique for manufacturing an electrode for secondary battery for improving an initial charge/discharge characteristic, containing a conductive polymer as an active material and at least one kind of swelling layer-shaped clay compound in an electrode. The technique is on the assumption that the application thereof is limited to electrodes using conductive polymer as the electrode active material, and more excellent characteristics are exerted when a swelling layer-shaped clay compound having an oleophilic surface is used.

However, when using a conductive polymer as an electrode, the stability is very low compared with other inorganic electrode materials. Thus, the conductive polymer is not suitable for the application to the batteries which demand a long lifespan. Moreover, upon adding a swelling clay mineral into the conductive polymer, a texture is sparsely formed by the largely swelled clay mineral. Such texture sparsely formed induces change in the configuration of the conductive polymer due to the pressure and contraction applied during the repetitive contraction and expansion of electrodes upon charging/discharging. Consequently, a prolonged lifespan and stability of the battery is deteriorated even more. In addition, by adding a clay mineral into a conductive polymer, the conductive polymer exhibits high rigidity. Thus, there are many problems such as a partial degradation of the conductive polymer due to an external impact.

SUMMARY OF THE INVENTION

Therefore, the present invention has been made to solve the above problems and other technical problems that have yet to be resolved.

As a result of a variety of extensive and intensive studies and experiments to solve the problems as described above, the inventors of the present invention have confirmed that an electrode material comprising a clay mineral in an amount of 5% by weight or less based on the total weight of the electrode material improves wettability by an electrolyte against the electrode material. Ultimately, excellent battery performances were achieved by having the electrolyte transfer easily. Moreover, the mechanical strength of the electrode material and stability of the battery were ensured. The present invention has been completed based on these findings.

DETAILED DESCRIPTION OF PREFERRED EMBODIMENTS

In accordance with an aspect of the present invention, the above and other objects can be accomplished by the provision of an electrode material, which contains an electrode active material, comprising a clay mineral in an amount of 5% by weight or less based on the total weight of the electrode material for increasing a mechanical strength of the electrode material and improving the impregnation ability of an electrolyte.

In general, the clay mineral may exist in an initial shape with a size of several hundred nanometers to several ten micrometers, or may have a plate shape, by separation between layers, with a thickness of 1 nm and a width of several micrometers to 100 μm. The present invention comprises both the initial shape and the plate shape of the clay mineral.

The clay mineral has high polarity, and thus has congeniality to a polar solvent. Therefore, even when the porosity of an electrode is very small due to very high energy density thereof, the wettability by the electrolyte may improve dramatically. As a result, the rate characteristics and preservation capacity of the battery can be improved. More specifically, since the electrode material contains a clay mineral, the interface resistance of the electrolyte at the interface of electrode material is reduced. Thereby the electrolyte is easily penetrated into the electrode material, and, as a result, the transferability of the electrolyte is increased.

In general, the electrode material is mainly composed of nonpolar materials. Thus, during the process of passing the electrode material through the electrolyte, the interface resistance between the electrode material and electrolyte may function as the rate determining step for the electrolyte transferability. Therefore, the clay mineral contained in the electrode material deteriorates such interface resistance thereby improves the electrolyte transferability dramatically.

In addition, the clay mineral contained in the electrode material functions as a filler which forms a composite with a binder so as to reinforce the mechanical strength of the electrode material. Thereby, the clay mineral prevents dissociation of the electrode material resulted by the pressure and contraction applied during the expansion and contraction of electrodes upon charging/discharging.

The clay mineral may have a content of 5% by weight or less based on the total weight of the electrode material. Preferably, the content may be in the range of 0.05 to 5% by weight. When the content is too small, it is difficult to exert a desired wettability. In contrast, when the content exceeds 5% by weight, an electric resistance is increased due to an excess amount of the clay mineral and the ion conductivity in the electrolyte is deteriorated, and thus is not preferable.

The clay mineral may have a particle size in the range of 1 nm to 100 μm.

There is no particular limit to the clay mineral, so long as it has no bad influence on the operation characteristics of the battery, while having congeniality to polar solvents. Preferable examples include one or two or more selected from the group consisting of smectite, bentonite, laponite, hectorite, gibbsite, chlorite, kaolinite, halloysite, pyrophylite-talc, montmorillonite (MMT), vermiculite, illite, mica, and brittle mica.

Even more preferably, montmorillonite may be used. The montmorillonite has a structure in which $Al^{3+}$ ion is substituted with $Mg^{2+}$, $Fe^{2+}$ and $Fe^{3+}$ in an alumina octahedral sheet and $Si^{4+}$ ion substituted with $Al^{3+}$ ion in a silica tetrahedral sheet. The montmorillonite exhibits negative charges in its overall structure. In order to balance the overall charges, there contains exchangeable cations and water molecules between the silica layers. Therefore, the montmorillonite has a strong polarity and very excellent trapping ability to the electrolyte which is simultaneously a polar and aprotic solvent.

In addition to the electrode active material, the electrode material may further include other components such as a viscosity adjuster, a conductive material, a filler, a coupling agent and an adhesive accelerator, which are used optionally or in any combination thereof.

The viscosity adjuster is a component used to adjust the viscosity of the electrode material, such that a mixing process of the electrode material and an application process of the electrode material to the current collector can be facilitated. The viscosity adjuster may be added in an amount of up to 30% by weight, based on the total weight of the electrode material. Examples of the viscosity adjuster may include, but are not limited to, carboxymethyl cellulose and polyvinylidene fluoride. Where appropriate, the above-mentioned solvent may also serve as the viscosity adjuster.

The conductive material is a component used to further improve the conductivity of the electrode active material and may be added in an amount of 1 to 20% by weight, based on the total weight of the electrode material. There is no particular limit to the conductive material, so long as it has suitable conductivity without causing chemical changes in the fabricated battery. Examples of conductive materials include conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The filler is an auxiliary component used to inhibit electrode expansion. There is no particular limit to the filler, so long as it does not cause chemical changes in the fabricated battery and is a fibrous material. Examples of the filler include olefin polymers such as polyethylene and polypropylene; and fibrous materials such as glass fiber and carbon fiber.

The coupling agent is an auxiliary component used to increase adhesive strength between the electrode active material and binder, and is characterized by having two or more functional groups. The coupling agent may be added in an amount of up to 30% by weight, based on the weight of the binder. The coupling agent may be a material in which one functional group forms a chemical bond via reaction with a hydroxyl or carboxyl group present on the surface of the silicon-, tin- or graphite-based active material, and the other functional group forms a chemical bond via reaction with the polymer binder. Specific examples of the coupling agent that can be used in the present invention may include, but are not limited to, silane-based coupling agents such as triethoxysilylpropyl tetrasulfide, mercaptopropyl triethoxysilane, aminopropyl triethoxysilane, chloropropyl triethoxysilane, vinyl triethoxysilane, methacryloxypropyl triethoxysilane, glycidoxypropyl triethoxysilane, isocyanatopropyl triethoxysilane and cyanatopropyl triethoxysilane.

The adhesive accelerator is an auxiliary component used to improve adhesive strength of the active material to the current collector, and may be added in an amount of less than 10% by weight, based on the weight of the binder. Examples of the adhesive accelerator that can be used in the present invention may include oxalic acid, adipic acid, formic acid, acrylic acid derivatives, itaconic acid derivatives and the like.

Among the electrode active material in the electrode material of the present invention, examples of the anode active materials that can be used may include a carbon-, silicon-, tin-, silicon-carbon-based materials. Examples of the cathode active materials that can be used may include layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ ($0 \leq x \leq 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithium nickel oxides of Formula $LiNi_{1-x}M_xO_2$ (M=Co, Mn, Al, Cu, Fe, Mg, B or Ga, and $0.01 \leq x \leq 0.3$); lithium manganese composite oxides of Formula $LiMn_{2-x}M_xO_2$ (M=Co, Ni, Fe, Cr, Zn or Ta, and $0.01 \leq x \leq 0.1$), or Formula $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$.

In accordance with another aspect of the present invention, the above and other objects can be accomplished by the provision of an electrochemical cell comprising an electrode in which the electrode material is coated on the current collector. The electrode may be a cathode and/or an anode, and preferably an anode.

The current collector in the electrode according to the present invention is a part where electrons migrate during the electrochemical reaction of the active material. Depending on the type of electrodes, there may exist an anode current collector and a cathode current collector.

The anode current collector is generally fabricated to have a thickness of 3 to 500 µm. Examples of materials for the anode current collector, which have suitable conductivity without causing chemical changes in the fabricated battery, include copper, stainless steel, aluminum, nickel, titanium, sintered carbon, copper or stainless steel having a surface treated with carbon, nickel, titanium or silver, and aluminum-cadmium alloys.

The cathode current collector is generally fabricated to have a thickness of 3 to 500 µm. There is no particular limit to materials for the cathode current collector, so long as they have high conductivity without causing chemical changes in the fabricated battery. Examples of materials for the cathode current collector, include stainless steel, aluminum, nickel, titanium, sintered carbon, and aluminum or stainless steel which was surface-treated with carbon, nickel, titanium or silver.

These current collectors may also be processed to form fine irregularities on the surfaces thereof so as to enhance adhesive strength to the electrode active materials. In addition, the current collectors may be used in various forms including films, sheets, foils, nets, porous structures, foams and non-woven fabrics.

The electrodes for secondary batteries according to the present invention may be used for both anode and cathode, and among them anode is preferable. Upon improving the wettability by the electrolyte on the hydrophobic anode, incomplete formation of solid electrolyte interface (SEI) film and deterioration of life characteristics may be prevented.

The secondary battery electrode is fabricated by coating a current collector with an electrode material containing an electrode active material, a binder, and optionally a conductive material and/or a filler. Specifically, the electrode may be fabricated by adding the electrode material to a predetermined solvent to thereby preparing a slurry, and applying the resulting slurry to the current collector such as metal foil, followed by drying and rolling, thereby obtaining a sheet-like electrode.

Preferred examples of solvents used in preparation of the electrode slurry may include dimethyl sulfoxide (DMSO) and N-methylpyrrolidone (NMP). The solvent may be used in an amount of up to 400% by weight, based on the total weight of the electrode material, and is removed during the drying process.

The electrochemical cell provides electricity through electrochemical reaction. For example, the electrochemical cell may be an electrochemical secondary battery or an electrochemical capacitor.

Particularly, the present invention can be preferably applied to a lithium secondary battery fabricated by injecting a lithium electrolyte, while having the thus fabricated electrode installed in a battery case.

In addition, such a secondary battery may be preferably used as a unit cell in the fabrication of a high-output and high-capacity battery pack by combining a plurality of the secondary batteries. The high-output and high-capacity battery pack is frequently applied with external forces such as vibration and external impact, thus an excellent mechanical strength against the external forces is required. Moreover, in the battery cell structure constituting the battery pack, the electrode active material is loaded in a large quantity based on the current collector, thus the impregnation ability of the electrolyte functions as an important factor for exerting a predetermined operating characteristics.

Hereinafter, the other remaining components necessary for the lithium secondary battery in accordance with the present invention will be described.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics, or kraft papers made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The non-aqueous electrolyte containing a lithium salt is composed of a non-aqueous electrolyte and lithium. As the non-aqueous electrolyte, a non-aqueous electrolytic solution, organic solid electrolyte and inorganic solid electrolyte may be utilized.

Examples of the non-aqueous electrolytic solution that can be used in the present invention may include aprotic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, 1,2-diethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte utilized in the present invention may include polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing ionic dissociation groups.

Examples of the inorganic solid electrolyte utilized in the present invention may include nitrides, halides and sulphates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}C_{10}$, $LiPF_6$, $LiCF_3SO_3$, $LiCF_3CO_2$, $LiAsF_6$, $LiSbF_6$, $LiAlCl_4$, $CH_3SO_3L_1$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

EXAMPLES

Now, the present invention will be described in more detail with reference to the following Examples. These examples are provided only for illustrating the present invention and should not be construed as limiting the scope and spirit of the present invention.

Example 1

1-1. Preparation of Cathode

As a cathode active material, 95% by weight of $LiCoO_2$, 2.5% by weight of Super-P (conductive material), and 2.5% by weight of PVdF (binder) were added to a N-methyl-2-pyrrolidone (NMP) solvent. 0.05% by weight of montmorillonite based on the total weight of the cathode active material was added to the cathode active material to prepare a cathode slurry. Thereafter, the cathode slurry was coated on a long sheet-like aluminum foil which was then dried and compressed, thereby preparing a cathode.

1-2. Preparation of Anode

As an anode active material, 95% by weight of artificial graphite, 2.5% by weight of Super-P (conductive material), and 2.5% by weight of PVdF (binder) were added to a N-methyl-2-pyrrolidone (NMP) solvent. 0.05% by weight of montmorillonite based on the total weight of the anode active material was added to the anode active material to prepare an anode slurry. Thereafter, the anode slurry was coated on a long sheet-like copper foil which was then dried and compressed, thereby preparing an anode.

1-3. Fabrication of Battery

A porous polyethylene separator (Celgard™) was disposed between the cathode and anode prepared in the above 1-1 and 1-2, and a solution of 1 M $LiPF_6$ in ethylene carbonate (EC) and ethyl methyl carbonate (EMC) as an electrolyte was injected into the separator to prepare a lithium secondary battery.

Example 2

A lithium secondary battery was prepared in the same manner as in Example 1, except that montmorillonite was not added to the anode.

Example 3

A lithium secondary battery was prepared in the same manner as in Example 1, except that montmorillonite was not added to the cathode.

Example 4

A lithium secondary battery was prepared in the same manner as in Example 1, except that 5% by weight of montmorillonite was added to the cathode and 5% by weight of montmorillonite was added to the anode.

Example 5

A lithium secondary battery was prepared in the same manner as in Example 4, except that 5% by weight of montmorillonite was not added to the anode.

Example 6

A lithium secondary battery was prepared in the same manner as in Example 4, except that 5% by weight of montmorillonite was not added to the cathode.

Comparative Example 1

A lithium secondary battery was prepared in the same manner as in Example 1, except that montmorillonite was not added to the anode and cathode.

Comparative Example 2

A lithium secondary battery was prepared in the same manner as in Example 1, except that 0.02% by weight of montmorillonite was added to the cathode and 0.02% by weight of montmorillonite was added to the anode.

Comparative Example 3

A lithium secondary battery was prepared in the same manner as in Example 1, except that 7% by weight of montmorillonite was added to the cathode and 7% by weight of montmorillonite was added to the anode.

Comparative Example 4

A lithium secondary battery was prepared in the same manner as in Example 1, except that 10% by weight of montmorillonite was added to the cathode and 10% by weight of montmorillonite was added to the anode.

Experimental Example 1

Thirty batteries prepared in the above respective Examples and Comparative Examples were charged to 4.2 V, and then an impact test was performed. The number of batteries that ignited due to the test is listed in Table 1. The impact test was carried out by dropping a metal bar with a length of 15.8 mm and a weight of 9.1 kg onto the center of a battery from a height of 61 cm.

Experimental Example 2

After charging/discharging the batteries prepared in the above respective Examples and Comparative Examples, the capacity after 300 cycles was calculated in the ratio of the initial capacity. The results are listed in Table 1.

Experimental Example 3

After charging the batteries prepared in the above respective Examples and Comparative Examples to 4.2 V, the ratio of capacity at the time of discharging with 0.5 C and 5 C, respectively, are listed in Table 1.

TABLE 1

| | Content of cathode (wt %) | Content of anode (wt %) | Number of ignited batteries | Preservation capacity after 300 cycles | Discharge capacity with 3 C |
|---|---|---|---|---|---|
| Example 1 | 0.05 | 0.05 | 0 | 92 | 93 |
| Example 2 | 0.05 | — | 1 | 86 | 90 |
| Example 3 | — | 0.05 | 2 | 91 | 92 |
| Example 4 | 5.0 | 5.0 | 0 | 90 | 89 |
| Example 5 | 5.0 | — | 0 | 83 | 85 |
| Example 6 | — | 5.0 | 0 | 88 | 88 |
| Comparative Example 1 | — | — | 13 | 65 | 72 |
| Comparative Example 2 | 0.02 | 0.02 | 8 | 67 | 74 |
| Comparative Example 3 | 7.0 | 7.0 | 0 | 75 | 79 |
| Comparative Example 4 | 10.0 | 10.0 | 0 | 69 | 75 |

As shown in Table 1, it was confirmed that Examples 2 and 5 in which the clay mineral was added only to the cathode exhibited relatively lower stability, life characteristics and rate characteristics compared with Example 1 or 4 in which the clay mineral was added to both electrodes, but exhibited a great improvement in the stability, life characteristics and rate characteristics compared with Comparative Example 1 in which no clay mineral was added. Moreover, it was confirmed that almost the same stability, life characteristics and rate characteristics exhibited for Examples 3 and 6 in which the clay mineral was added only to the anode and for Example 1 or 4 in which the clay mineral was added to both electrodes. This is assumed to be due to the improvement in the SEI film of the anode in accordance with the improvement in the wettability by the electrolyte.

Meanwhile, it was confirmed that the battery prepared in Comparative Example 2 in which the clay mineral was added in the amount of 0.02% by weight based on the total weight of the electrode material had slightly improved stability, life characteristics and rate characteristics compared with the battery prepared in Comparative Example 1, but had a greatly deteriorated stability, life characteristics and rate characteristics compared with the battery prepared in Examples 1 to 6.

In addition, it was confirmed that the batteries prepared in Comparative Examples 3 and 4 had greatly improved stability, and slightly improved life characteristics and rate characteristics compared with the batteries prepared in Comparative Examples 1 and 2, but had greatly deteriorated life characteristics and rate characteristics compared with the batteries prepared in Examples 1 to 6. This is assumed to be due to increase in the electric resistance and deterioration in the ion conductivity in the electrolyte in accordance with an excess amount of the clay mineral added thereto.

The increase in the stability was resulted by the clay mineral increasing the mechanical strength of the electrode material itself. On the other hand, the improvement in the life characteristics and rate characteristics was resulted by the excellent wettability by the electrolyte against the electrode material via adding the clay mineral to the electrode material, thereby increasing the impregnation ability of the electrolyte to the electrode compared in the same time line.

INDUSTRIAL APPLICABILITY

As apparent from the above description, the electrode material according to the present invention comprises the clay mineral so as to improve the mechanical strength and wettability by the electrolyte with high efficiency. Ultimately, the electrode material has effects of improving stability, life characteristics and rate characteristics of a battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electrode material for a lithium secondary battery containing a non-aqueous electrolyte, which contains an electrode active material and polyvinylidene fluoride (PVdF) as a binder, comprising a clay mineral in an amount of the range of 5% by weight or less based on the total weight of the electrode material for increasing the mechanical strength of the electrode material and improving the impregnation ability of an electrolyte, wherein the clay mineral is montmorillonite (MMT).

2. The electrode material according to claim 1, wherein the clay mineral is contained in the amount of 0.05 to 5% by weight based on the total weight of the electrode material.

3. The electrode material according to claim 1, wherein the clay mineral has a particle size in the range of 1 nm to 100 μm.

4. An electrochemical cell comprising an electrode in which the electrode material according to claim 1 is coated on a current collector.

5. The electrochemical cell according to claim 4, wherein the electrode is a cathode and/or an anode.

6. The electrochemical cell according to claim 4, wherein the electrode is an anode.

7. The electrochemical cell according to claim 4, wherein the cell is a secondary battery or a capacitor.

8. The electrochemical cell according to claim 7, wherein the secondary battery is a lithium secondary battery.

9. The electrochemical cell according to claim 7, wherein the secondary battery as a unit cell is utilized in a high-output and high-capacity battery pack.

* * * * *